United States Patent [19]

Casady et al.

[11] Patent Number: 4,908,819
[45] Date of Patent: Mar. 13, 1990

[54] INTEGRATED DATA VOICE MULTIPLEXER SUPPORTING HANDSHAKE AND LOOP-BACK PROTOCOLS

[75] Inventors: Donald R. Casady; Ioan V. Teodorescu, both of Tulsa, Okla.

[73] Assignee: Seiscor Technologies, Inc., Tulsa, Okla.

[21] Appl. No.: 293,531

[22] Filed: Dec. 23, 1988

Related U.S. Application Data

[63] Continuation of Ser. No. 59,440, Jun. 8, 1987, abandoned.

[51] Int. Cl.$^4$ .............................................. H04J 3/14
[52] U.S. Cl. ...................................... 370/15; 370/11; 370/76
[58] Field of Search ................... 370/11, 76, 110.4, 15

[56] References Cited

U.S. PATENT DOCUMENTS

| | | | |
|---|---|---|---|
| 3,178,515 | 4/1965 | Bramer et al. | 370/11 |
| 3,626,417 | 12/1971 | Gilbert | 370/11 |
| 4,127,816 | 11/1978 | Grosso et al. | 370/15 |
| 4,196,321 | 4/1980 | Bosik | 370/15 |
| 4,217,467 | 8/1980 | Kobayashi et al. | 370/11 |
| 4,410,979 | 10/1983 | Tanabe et al. | 370/11 |
| 4,431,875 | 2/1984 | Simokat | 379/5 |
| 4,488,294 | 12/1984 | Christensen et al. | 370/84 |
| 4,498,186 | 2/1985 | Hwang et al. | 375/7 |
| 4,529,979 | 7/1985 | Kusama et al. | 370/15 |
| 4,564,933 | 1/1986 | Hirst | 370/15 |
| 4,573,151 | 2/1986 | Jotwani | 370/56 |
| 4,630,268 | 12/1986 | Rodenbaugh | 370/15 |
| 4,660,194 | 4/1987 | Larson et al. | 370/15 |
| 4,677,608 | 6/1987 | Forsberg | 370/11 |

OTHER PUBLICATIONS

"Integrated Data Voice Carrier", Seiscor Technologies, Jan. 1985, IDVC Technical Manual, p. 10.

Primary Examiner—Douglas W. Olms
Attorney, Agent, or Firm—Steven C. Stewart; William R. Clark; Richard M. Sharkansky

[57] ABSTRACT

An integrated data voice multiplexer (IDVM) capable of simultaneously supporting loop-back and communication handshake protocols with no performance degradation. This allows the IDVM to be used in both point-to-point and packet switch networks. The IDVM is of the type using frequency shift keyed FSK modulation of two or more carriers to send a data signal. The presence or absence of carrier signals indicates loop-back state. Narrowband modulation is selectively added to at least one carrier to support handshake protocol. The preferred narrowband modulation is biphase at a rate lower than the FSK modulation rate. Encoder, decoder, data hold and detect circuits for supporting standard RS232 protocol are disclosed.

19 Claims, 5 Drawing Sheets

INTEGRATED DATA VOICE MULTIPLEXER SUPPORTING HANDSHAKE AND LOOP-BACK PROTOCOLS

This application is a continuation of application Ser. No. 059,440, filed June 8, 1987, now abandoned.

BACKGROUND OF THE INVENTION

This invention relates to telephone communications and in particular to data voice multiplexers.

It has long been the desire of the telephone industry to maximize utilization of a subscriber's telephone line. One way is to use a data voice multiplexer that allows an analog voice signal from a telephone and a digital data signal from data equipment to share one subscriber line. Thus, if data equipment and a conventional telephone are tied to a data voice multiplexer located in a remote office, only one subscriber line shared by the telephone and data equipment needs to be fed between the remote office and its associated central office.

In general, data voice multiplexers send the data signal by using a pair of frequency shift keyed (FSK) carriers at a frequency higher than the bandwidth of the voice signal. One carrier is used to indicate mark, or a logic low bit, and the other carrier to indicate space, or a logic high bit. The voice signal is then frequency multiplexed with the FSK carriers to obtain a frequency multiplexed signal. The frequency multiplexed signal is coupled via the subscriber line to the central office. A similar data voice multiplexer at the central office separates the data and voice signals. The separated voice signal is coupled to a conventional voice switch or voice multiplexer and thus to a voice network. The separated data signal is coupled to a switched data network, a local digital data interface, or combined with a voice signal by a third data voice multiplexer and sent along another subscriber line to data equipment located at a second remote office. The data voice multiplexer may be configured to support full duplex communication by using a second pair of FSK carriers so that data may be sent simultaneously in both directions.

The full duplex FSK carrier frequencies typically used for 9600 baud service are 36 and 48 kilohertz to indicate mark and space in one direction, such as from the remote office to the central office, and 84 and 96 kilohertz to indicate mark and space in the other direction, from the central office to the remote office. It is desirable that interference with other subscriber lines is minimized by insuring switching between mark and space frequencies is phase coherent.

The permissible distance between remote and central offices is limited by the American wire gauge (AWG) of the subscriber line. In practice, data voice multiplexers have been found to operate well at a distance of 9.8 miles using 19 AWG lines down to 3.1 miles using 26 AWG lines.

Two applications in particular have become popular for data voice multiplexers. The first is simple point-to-point communication between data terminal equipment at a first remote office and data communications equipment located at a second remote office. The first and second remote offices are connected to a common central office. In point-to-point applications, it is often desirable to provide communications handshake protocol such as that required to support the Electronic Industries Association (EIA) standard RS-232 interface. This requires sending and receiving handshake signals to indicate either a signaling true state (STS) or signaling false state (SFS) at either end of the line. Data voice multiplexers have been developed to support such protocol by using the presence or absence of an FSK carrier in either direction to indicate the presence or absence of STS. For example, the central office presumes that a remote office is in STS if at least one of its FSK carriers is present. One FSK carrier is selected as an idle carrier, such as the mark FSK carrier. If no data is being sent at a particular instant, but the data equipment wishes to remain connected, the idle carrier remains on at all times, thereby maintaining the data equipment is in STS. If the idle carrier is turned off, it is presumed that SFS has been entered and the data equipment no longer wishes to communicate.

A second popular application for data voice multiplexers has been in packet switch networks. Here, data is multiplexed at the first remote office as before. However, after data is separated at the central office, it is not directly connected to another remote office, but rather is first sent to a statistical multiplexer. The statistical multiplexer assembles data from several sources and sends it along a high-speed data link to a packet switch located at a network control center. This packet switch is responsible for steering data to another statistical multiplexer associated with a distant second central office. At the second central office, the data is demultiplexed and fed to a second remote office associated with the second central office. Data fed from the second central office may be sent to the second remote office through an additional data voice multiplexer.

Data voice multiplexers developed for use with packet switch networks typically support loop-back testing methodologies. In particular, the integrity of the entire packet switch network must be testable remotely from the network central center. This is done by allowing the network control center to initiate loop-back commands to remote offices over the packet switch network. Such loop-back commands are first detected by the central office statistical multiplexers. Upon detection of a loop-back command for one of its associated remote offices, a central office statistical multiplexer feeds a loop-back command along the subscriber line to the associated data voice multiplexer at the remote office. A common method for indicating loop-back between central and remote data voice multiplexers is by turning off an idle carrier. Upon detection of a turned off idle carrier, the remote data voice multiplexer enters a loop-back test mode. Once loop-back test mode is entered, the central office data voice multiplexer typically restores the idle carrier after a predetermined delay, and sends test data for a predetermined time. The remote data voice multiplexer echos the test data back to the central office for a predetermined time while the central data voice multiplexer checks to see if the correct test data is returned. Standard protocols for loop-back testing exist, such as the International Telegraph and Telephone Consultive Committee (CCITT) Standard V.54 Loop 2.

SUMMARY OF THE INVENTION

We have realized it is desirable for a data voice multiplexer to simultaneously support both handshake and loop-back protocols. With current data voice multiplexers, if handshake protocol is required, communications over a packet switch network cannot be supported. If it is desired to test the subscriber line from a central office such as required in a packet switch network, handshake protocol cannot be supported. It is also desirable to allow some manual loop-back testing in a point-to-point application, which is not currently possible if handshake support is required. Although both protocols could be supported by adding additional carrier frequencies, this would increase the necessary subscriber line bandwidth and adversely affect the allowable distance between remote and central offices.

The two present types of data voice multiplexers cannot be mixed. That is, the equipment installer must be careful not to allow a data voice multiplexer supporting point-to-point communication to be connected to one supporting packet switch networks. If this occurs, neither multiplexer can properly interpret why an idle carrier has been dropped, as they cannot know whether the dropped carrier is to be interpreted as a command to enter loop-back mode or as a handshake signal. An additional difficulty is that the user must physically switch between the two types if he desires to communicate with both point-to-point computer system and one available over a packet switch network.

An object of this invention is thus to provide an integrated data voice multiplexer capable of simultaneously supporting both handshake and loop-back protocol.

Another object is to have the handshake protocol operate without interrupting carriers so that a loop-back scheme can be supported by interrupting carriers.

A further object is to accomplish this without adversely affecting data transmission speed or the permissible subscriber line length between central and remote offices.

These and other objects are provided by a data voice multiplexer featuring a normally idle carrier having a narrowband encoding modulation when in signaling false state. The narrowband modulation is narrower in frequency than any frequency shift modulation used for sending data. The encoding modulation may be coherent phase or amplitude modulation. When signaling true state is to be entered, modulation is removed from the idle carrier.

In either signaling true state or signaling false state, a dropped carrier is used to indicate loop-back mode. A level detector associated with the data voice multiplexer detects loop-back and can be used to force received data to a known state when received carrier drops below a predetermined level.

An advantage of this invention is that both handshake and loop-back methodologies can be supported with a single data voice multiplexer. No appreciable bandwidth increase is required since the encoding modulation has a bandwidth much smaller than the data rate.

BRIEF DESCRIPTION OF THE DRAWINGS

These and other objects, features, and advantages become evident from examination of the following detailed description when read in connection with the accompanying drawings where.

DETAILED DESCRIPTION OF THE PREFERRED EMBODIMENTS

Figure 1:
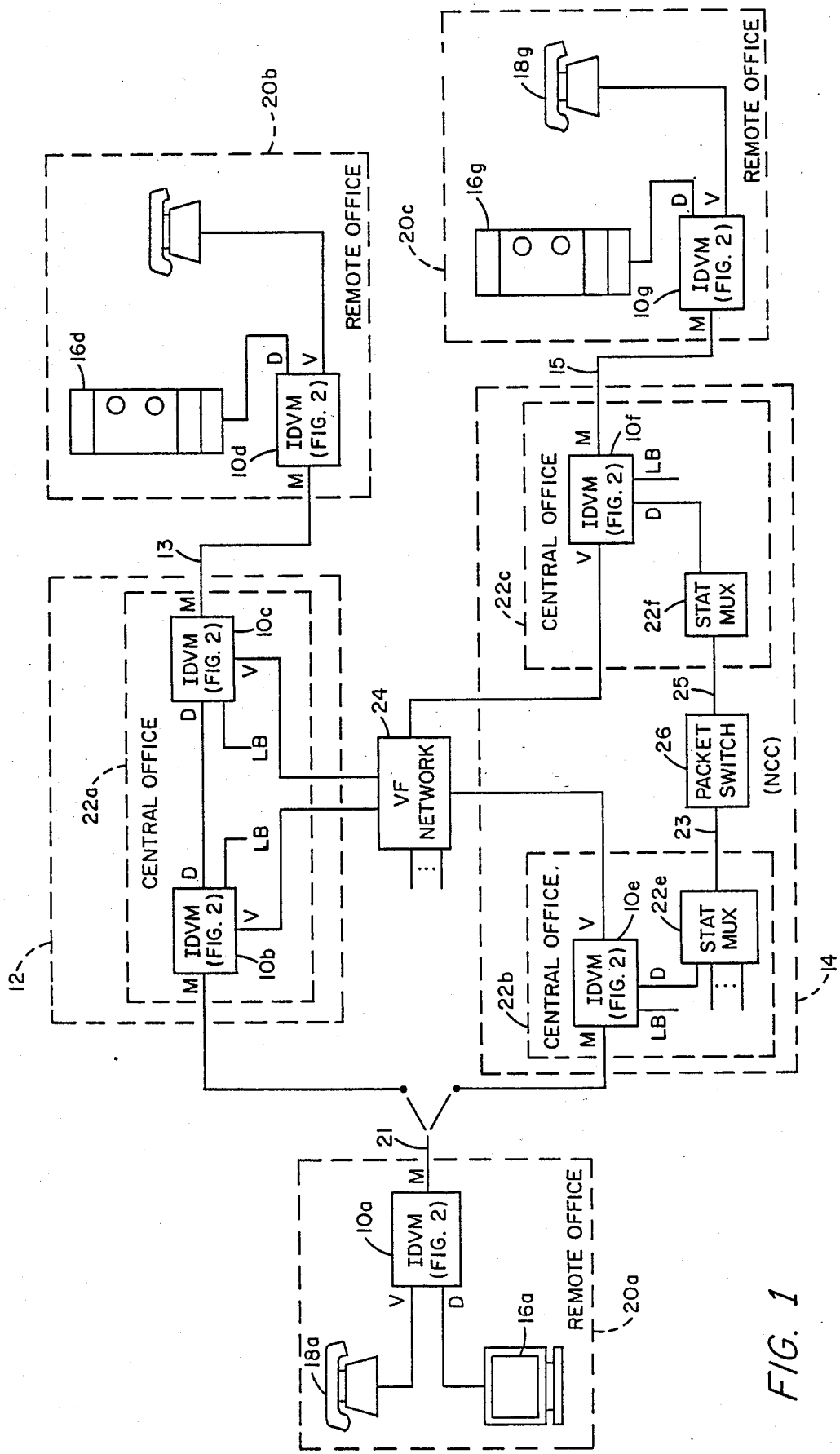
FIG. 1 shows block diagrams of voice and data communications networks using an integrated data voice multiplexer in point-to-point and packet switch network applications according to this invention.

Now referring to the drawings, where like reference characters designate corresponding parts throughout the several views, the invention is shown in FIG. 1 as an integrated data voice multiplexer (IDVM) 10a–g capable of use in a point-to-point connection 12 or a packet switch connection 14. Thus, for example, the user of a computer terminal 16a (also referred to as data terminal equipment) located at a remote office 20a may communicate with the computer system 16d (also referred to as data communication equipment) located at remote office 20b using the point-to-point connection 12 or may also communicate with a computer system 16g located at a remote office 20c using the packet switch connection 14.

An exemplary IDVM 10a takes voice frequency signals available at a voice port V from a telephone 18a, and data signals available at a data port D from data terminal equipment 16a and combines them into an outgoing multiplexed signal at multiplexed port M. IDVM 10a also separates an incoming signal on multiplexed port M into voice port V and data port D signals provided to telephone 18a and data terminal equipment 16a, respectively. Thus, both voice and data signals may be passed to and from telephone 18a and data terminal equipment 16a along a single subscriber line 21 connected to IDVM 10a at port M.

In order for data terminal equipment 16a at remote office 20a to send data to data communications equipment 16d at remote office 20b, remote offices 20a and 20b are coupled via point-to-point connection 12. Point-to-point connection 12 comprises a single central office 22a having a second IDVM 10b and third IDVM 10c coupled in a point-to-point configuration. In particular, multiplexed port M of IDVM 10a is coupled to multiplexed port M of second IDVM 10b. IDVM 10b separates the voice frequency signal originating from telephone 18a to its voice port V and couples it to a voice frequency network 24. The data signal available at data port D of IDVM 10b is fed to the data port D of the third IDVM 10c. The third IDVM 10c couples the data signal and a voice signal from the voice frequency network 24 to multiplex port M of IDVM 10c for transmittal to remote office 20b over a second subscriber line 13. Upon arrival at remote office 20b, the data signal separated by a fourth IDVM 10d is fed to data communications equipment 16d via data port D of IDVM 10d. The voice port V of IDVM 10d is used to provide voice service to a telephone 18d located at remote office 20b. Data is transmitted from data communications equipment 16d at remote office 20b to data terminal equipment 16a at remote office 20a in similar fashion but reversed in flow as IDVMs 10a–d are bidirectional or full duplex. Data ports D of IDVMs 10a–d include data signal lines as well as handshaking signal lines, as discussed in greater detail in connection with FIG. 2. Additionally, a loop-back input LB is provided to IDVMs 10b and 10c to allow the initiation of a loop-back test from central office 22a. If a loop-back command is asserted to IDVM 10b, for example, appropriate signals are sent along subscriber line 21 to IDVM 10a to cause it to enter a loop-back mode. Similarly, a loop-back input on IDVM 10c allows testing of its connection to IDVM 10d along subscriber line 13.

IDVM 10a at remote office 20a may also be connected via subscriber line 21 to data communications equipment 16g available through packet switch connection 14. While connections are described below as following from data terminal equipment 16a to data communications equipment 16d or 16g, it should be understood that these connections are full duplex and data travels in both directions. In particular, packet switch connection 14 includes a central office 22b having an IDVM 10e. IDVM 10e separates the voice portion of the multiplexed signal and feeds it to voice frequency network 20 as before. Here, however, the separated data signal at data port D is fed to a statistical multiplexer 22e. Statistical multiplexer 22e combines the data port D output from IDVM 10e with data from other sources 21e along a dedicated high-speed data transmission line 23 coupled to a packet switch network 26. Packet switch 26 is typically located at a network control center (NCC). The statistically multiplexed high-speed data is routed along another high-speed line 25 to a second statistical multiplexer 22f associated with another central office 22c. There, a second statistical multiplexer 22f separates high-speed data signals, one of which is fed to data port D of another IDVM 10f. IDVM 10f combines this data with a voice frequency signal from the voice frequency network 20 at its multiplexed output M. It feeds the multiplexed signal along a subscriber line 15 between central office 22c and the remote office 20g associated with data communications equipment 16g. In this configuration as well, the lines fed to data ports D also include input and output data signals as well as handshake signals. Here, it is necessary for the devices coupled to packet switch network 26 to be testable from the network control center. For example, in this configuration, it is necessary for loop-back commands to be fed from packet switch network 26 along high-speed line 23 to statistical multiplexer 22a so that each of the data sources 21e connected to statistical multiplexer 22e may be tested. This allows testing the integrity of the complete connection between data terminal equipment 16a at remote office 20a and data communications equipment 16g located at remote office 20g from the network control center. The network control center initiates loop-back commands along packet switch network 26 to statistical multiplexers such as 22e and 22f located at the associated central offices. At statistical multiplexer 22e, the loop-back command is detected and fed to the loop-back input LB of the associated IDVM 10e. Upon detection of a loop-back command, IDVM 10e passes this information along subscriber line 21 to IDVM 10a located at remote office 20a. IDVM 10a may then acknowledge receipt of the loop-back command and enter loop-back mode.

Figure 2:
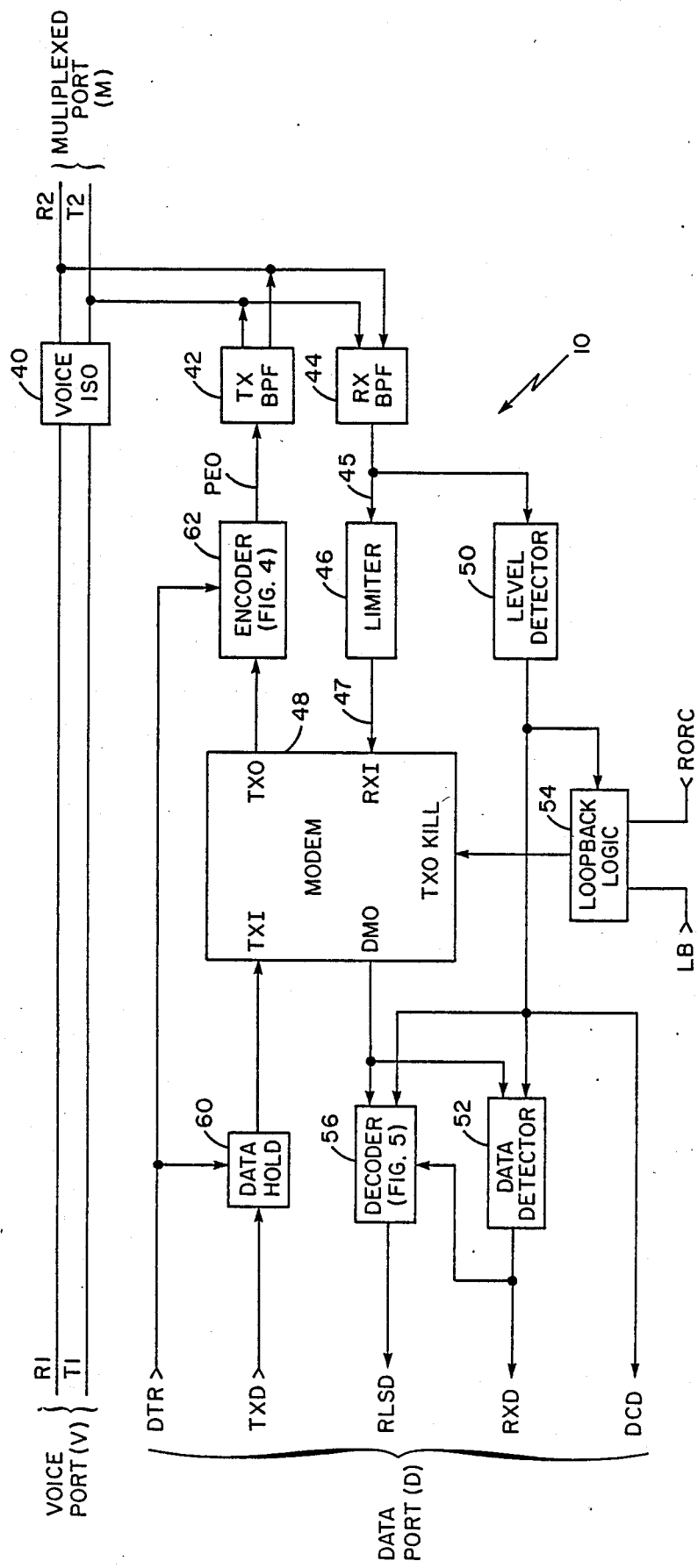
FIG. 2 is a more detailed block diagram of an integrated data voice multiplexer according to this invention.

FIG. 2 shows an integrated data voice multiplexer 10 IDVM in more detail, including a voice isolator 40, transmit 42 and receive 44 bandpass filters, limiter 46, digital modem 48, level detector 50, data detector 52, loop-back logic 54, decoder 56, data hold circuit 60, and encoder 62. The signals associated with voice port V and multiplexed port M of IDVM 10 are the familiar ring and tip conductors R1, T1, and R2, T2. The signals associated with data port D shown here are certain signals in accordance with the RS232 standard, but it should be understood that other communication handshake protocols can be supported as well. The signals shown include data terminal ready DTR, transmit data input TXD, remote line sense data RLSD, receive data RXD, and data carrier detect DCD. These signals are fed to and from a digital data source such as data terminal equipment 16a (FIG. 1) or data communications equipment 18d. The operation of IDVM 10 shall first be described as it demultiplexes voice and data signals at the multiplexed port M to the voice port V and data port D. Its operation as a multiplexer of signals on voice port V and data port D to provide a multiplexed signal at multiplexed port M connection will then be described.

A multiplexed signal is received at multiplexed port M on conductors R2 and T2, and fed to both the voice frequency isolator 40 as well as receive bandpass filter 44. Voice isolator 40 performs a low-pass filter function, typically with a cut-off frequency below 6 kilohertz to provide the voice frequency signal at the voice port V at conductors T1 and R1.

Receive bandpass filters 44 include a pair of bandpass filters, centered at the receive carrier frequencies, to prevent voice signals from entering the data signal portion of IDVM 10. As the data portion of the multiplexed signal at port M is typically a frequency shift-keyed (FSK) modulated signal, there are two receive carrier frequencies, one for space and one for mark. The receive carriers for an IDVM 10 located at a remote office typically are 36 kilohertz and 48 kilohertz for space and mark respectively. One carrier, usually the mark carrier, is selected as an idle carrier. The idle carrier remains on when no data is to be sent presently, but the connection between remote office 20 and central office 22 is to be maintained. The receive frequencies for a central office IDVM 10 usually are 84 kilohertz and 96 kilohertz for space and mark. The receive frequencies can be set upon installation of IDVM 10. Receive bandpass filter 44 outputs a filtered FSK signal 45 fed to limiter 46. Limiter 46 converts the filtered FSK signal 45 to a digital filtered FSK signal 47. This digital filtered FSK signal 47 is fed to digital modem 48 at its receiver input RXI. Digital modems known in the art typically include a digital demodulator section having a digital discriminator and digital low-pass filter (not shown). This demodulator portion provides a demodulated output DMO. As will be discussed with FIG. 3, the demodulated output DMO of digital modem 48 is a digital signal having a mostly logic low voltage when a mark receive frequency is present in the filtered FSK signal 45 and a mostly logic high voltage when a space frequency is present in the filtered FSK signal 45.

Also operating on the output of receive bandpass filter 44 is level detector 50. Level detector 50 determines if the voltage level of the filtered FSK signal 45 is adequate. It outputs a data carrier detect DCD signal indicative of the voltage level.

This data carrier detect DCD signal is one of the signals fed to loop-back logic 54. In some circumstances, data carrier detect DCD is used to determine if loop-back mode should be entered. The function of loop-back logic 54 depends upon whether IDVM 10 is located at a central office 22 or a remote office 20. If IDVM 10 is located at a remote office 20 and if data carrier detect DCD indicates an inadequate carrier level, loop-back logic 54 provides a logic signal to a TXO Kill input of digital modem 48 to kill its transmitter output TXO. The location of the IDVM 10 may be indicated to loop-back logic 54 by a remote or central RORC Logic signal. Alternately, if IDVM 10 is located at a central office 22, the desire to initiate a loop-back is indicated via the loop-back input LB. Loop-back logic 54 feeds this to the TXO Kill input of digital modem 48. Loop-back logic 54 may contain other logic circuits so as to conform to loop-back testing standards such as the CCITT Standard V.54 Loop 2 or other standards. Such logic typically initiates or restores the carriers after a predetermined period and then enters a data loop-back testing mode. The data loop-back mode is terminated after expiration of a second predetermined period.

Data carrier detect DCD is also fed as an output signal from IDVM 10 at data port D. It is also used by data detector 52 and decoder 56.

Data detector 52 normally passes the demodulated output DMO of digital modem 48 as the receive data RXD signal at data port D. If level detector 50 indicates inadequate filtered FSK signal level, data detector 52 clamps receive data RXD to a predetermined logic level such as mark.

Decoder 56 operates on both the demodulated output DMO of digital modem 48 and the data carrier detect DCD signals. Decoder 56 determines if there is modulation such as phase reversals in the demodulated output DMO. If so, it outputs a remote line sense data RLSD signal indicating that a signaling false state has been entered. Decoder 56 uses the data carrier detect DCD signal to clamp remote line sense data RLSD to a known state if the receive data carrier levels are inadequate. Decoder 56 also uses the receive data RXD output of data detector 52, as it need only look for modulation in the idle carrier. A decoder 56 embodied as a phase reversal detector is described in more detail in FIG. 5.

The operation of IDVM 10 as a transmitter will now be described. Data to be transmitted by the data source is fed as a logic signal to the transmit data TXD input. A data terminal ready DTR signal indicates when the data present at transmit data TXD is valid. When data terminal ready DTR enters the true state, data hold circuit 60 allows digital data to pass to a transmit data input TXI of digital modem 48. A modulator portion of modem 48 provides FSK carrier signals at a transmitter output TXO modulated in accordance with transmit data TXD. Thus, transmitter output TXO is a digital signal having one frequency when a mark is to be transmitted, and another frequency when a space is to be transmitted. The modulator portion of digital modem 48 may include a digital low-pass filter with a cutoff frequency of 9600 hertz feeding a digital modulator (not shown). The transmitter output TXO of digital modem 48 is then fed to encoder 62 for encoding a further modulation if data terminal ready DTR is false. As transmit data TXD is forced to the idle carrier frequency when data terminal ready DTR is false, modulation is encoded only when transmitter output TXO is at the idle carrier frequency. An encoder 62 operating as a phase reversal modulator is described in more detail in connection with FIG. 4. The output of encoder 62 is transmitter encoded output TEO. This signal is fed to the transmit bandpass filters 42. Transmit bandpass filters 42 consist of two bandpass filters at 36 and 48 or 72 and 96 kilohertz, depending upon whether IDVC 10 is located at the remote 20 or central office 22, respectively. The output of transmit bandpass filters 42 is coupled to multiplexed port M.

Regardless of whether IDVM 10 is located at the remote 20 or the central office 22, when describing its signaling functions, the instant unit is referred to as the near end unit and the other unit is referred to as the far end unit. Thus, when discussing the operation of a remote office 20 IDVM such as 10a (FIG. 1), the remote office 20 is referred to as the near end and the central office 22 as the far end. Also, when discussing the operation of a central office 22 IDVM such as IDVM 10b (FIG. 1), the central office is referred to as the near end and the remote office is referred to as the far end.

Figure 3:
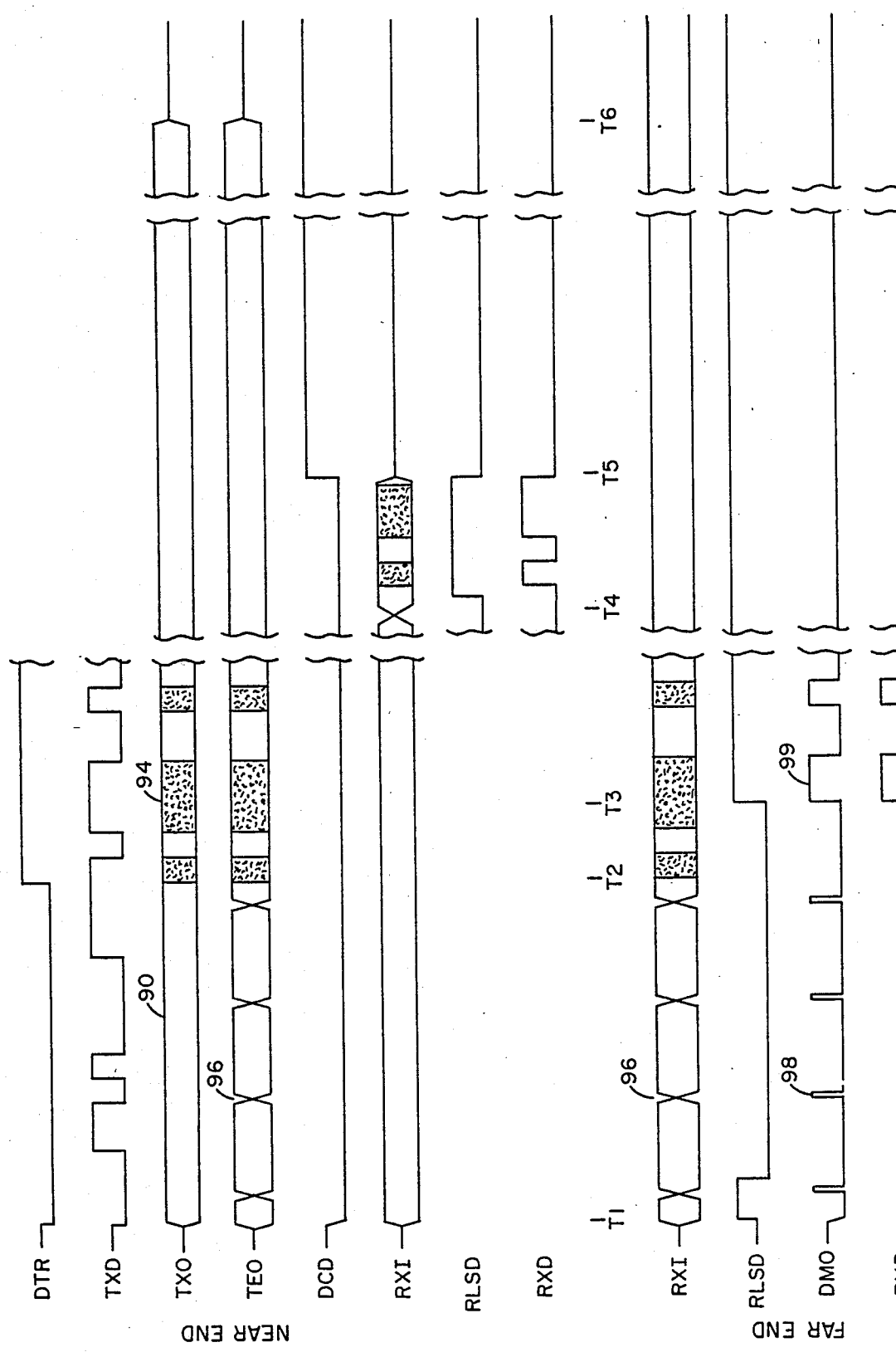
FIG. 3 is a timing diagram showing the various handshake signals fed between integrated data voice multiplexers.

The signaling operation of an IDVM 10, regardless of whether it is located at the remote office 20 or the central office 22, is now further understood by examination of FIG. 2 together with the timing diagram in FIG. 3. In the situation depicted there, a near end unit is transmitting to a far end unit from time T1 to T4. Between times T4 and T6, the near end is receiving data from the far end. Logic low levels indicate signals in a false state and logic high the true state. At time T1, the near end unit has its data terminal ready DTR signal in a false state to indicate that it is not yet ready to send data. Transmit data TXD may be switching between logic true and false to indicate that data is present. However, the fact that data terminal ready DTR is kept false means that transmit data TXD is not to be sent to the far end. Thus, data hold circuit 60 outputs a logic level indicating idle state to the transmit input TXI of digital modem 48. Its transmit output TXO is thus at the idle or mark frequency. The depiction of transmit output TXO in FIG. 3 at time T1 is thus shown as a mark carrier signal; the details of the oscillations in this signal at the carrier frequency have been removed for clarity. Instead, the light shaded portions 90 of modulated signals such as transmit output TXO are to be interpreted as being at the mark frequency, and darker shaded portions 94 are to be interpreted as being at the space frequency. Given that at time T1 data terminal ready DTR is false, the transmitter encoded output TEO signal from encoder 62 will have periodic modulations such as phase reversals placed within it. These phase reversals are indicated in FIG. 3 as amplitude dropouts 96. At a time T2, the data terminal ready DTR signal is moved to a logic true state. This causes the transmit input TXI and hence the transmit output TXO of digital modem 48 to begin switching between mark and space frequencies in accordance with transmit data TXD. It also causes encoder 62 to stop placing phase reversals in its transmitter encoded output TEO.

Shifting attention to what happens at far end, it can be understood how IDVM 10 operates as a receiver. The incoming multiplexed signal is fed through receive bandpass filter 44 and limiter 46 to provide a digital FSK modulated signal 46 at the receive input RXI of modem 48. The receive input RXI appears much as the TEO transmitter encoded output at the near end. The demodulated output DMO of modem 48 appears as a digital signal having a mostly logic false or mark value between time T1 and T2 with the periodic phase reversals 96 in receive input RXI causing narrowband periodic pulses 98. Data detector 52 operates as a filter with a cut-off frequency low enough to allow pulses 99 at the data rate in demodulated output DMO to be passed but narrowband pulses 98 due to phase reversals 96 to be inhibited. The occurrence of narrowband pulses 98 in demodulated output DMO is detected by decoder 56 to cause the remote line sense data RLSD signal to enter the logic false state. Note there is delay between time T1 and the time at which remote line sensed data RLSD drops to logic low—this is because the encoded phase reversals 96 are at rate lower than the data rate, and several data periods may pass before a narrowband pulse 98 occurs. Upon detection of the absence of periodic phase reversals 96 in demodulated output DMO such as by time T3, decoder 56 allows the remote line sense data RLSD signal to assume a logic true state. The time delay between times T2 and T3 is known as the turn-around delay. This delay may be as long as the period chosen for phase reversals 96. This length chosen for this period must be traded off with the additionally small bandwidth needed to transmit the phase encoded output PEO given its phase reversals. In practice, a phase reversal rate of 1/16 the data rate has been found acceptable.

Figure 4:
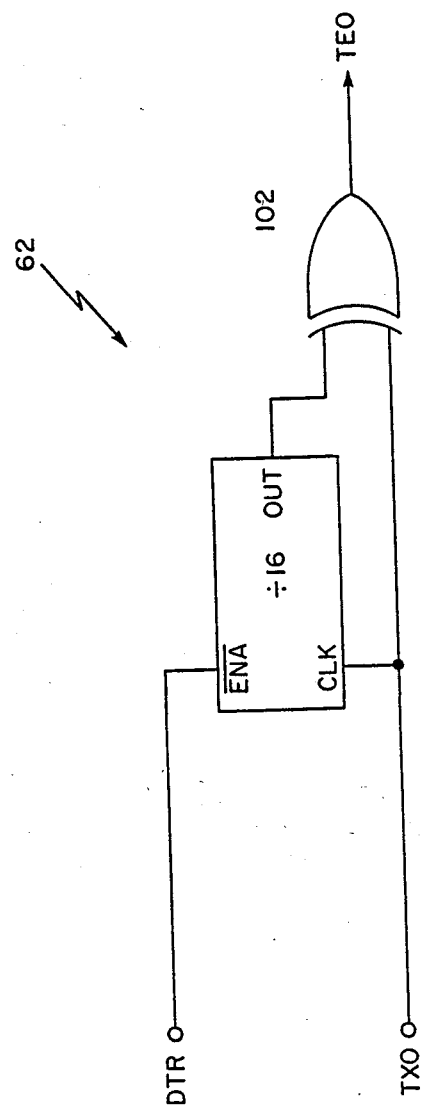
FIG. 4 is a schematic of a phase encoder and data hold circuit forming a portion of the integrated data voice multiplexer.

FIG. 4 shows a phase encoder 62 with more detail. It operates using the data terminal ready DTR signal to encode phase reversals in the transmitter output TXO signal before it is fed as the transmitter encoded output TEO signal. If data terminal ready DTR is at a false level, indicating that data is not to be sent, it is desired that phase reversals be placed in transmitter output TXO at a rate less than the data rate. Shown in FIG. 4 and in the preferred embodiment, phase encoder 62 operates as a divide by 16 counter 100. The data terminal ready DTR input is directly fed to a not enable input ENA. Transmitter output TXO, being a digital signal, may be used to clock counter 100. The divide by 16 output available at counter 100 output OUT is then exclusive or with transmitter output TXO by gate 102 to insert the desired phase reversals. Counter 100 and exclusive or gate 102 may be implemented using standard logic circuits available as part numbers 74HC4024 and 74HC86 from the Texas Instruments Corporation of Dallas, Tex.

Figure 5:
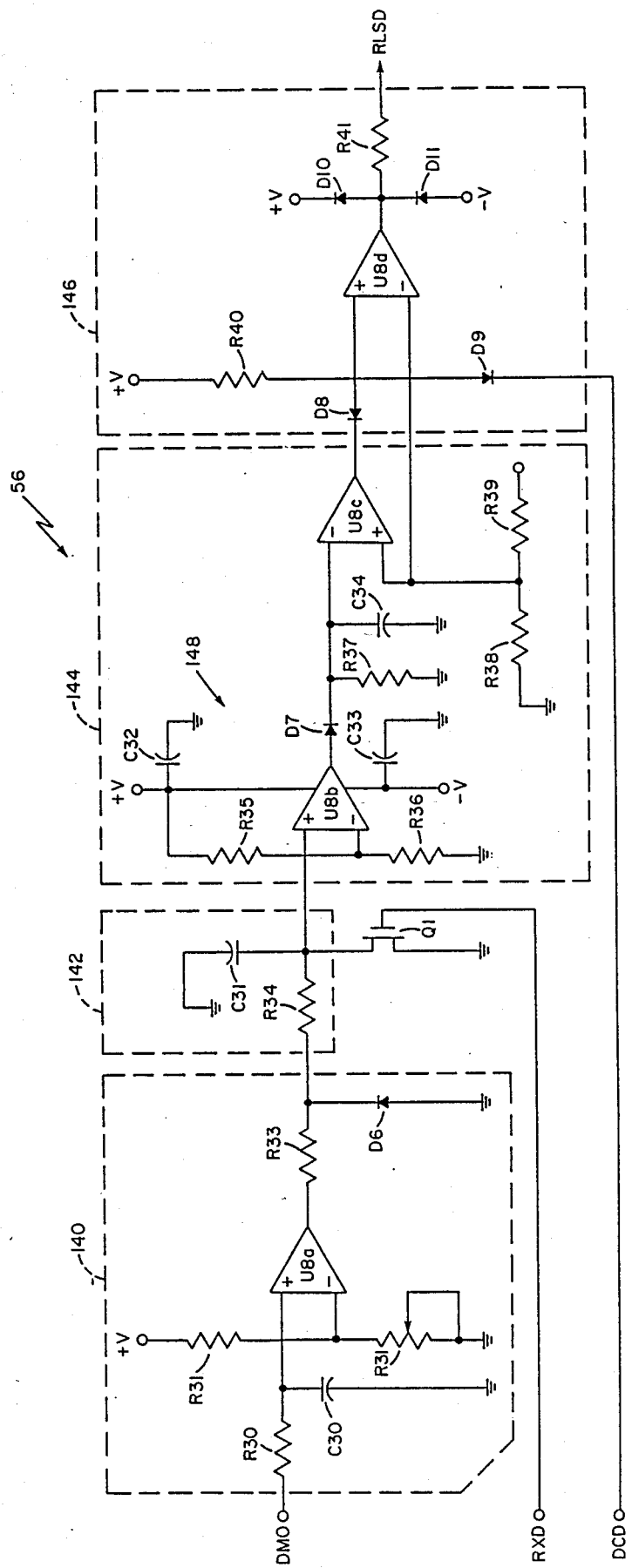
FIG. 5 is a schematic of a phase decoder associated with the invention.

FIG. 5 shows a phase decoder 56 with more detail. Decoder 56 removes phase reversals from demodulated output DMO to provide remote line sense data RLSD. It uses receiver data RXD and data carrier detect DCD to perform this function. Phase decoder 56 preferably includes a fast integrator 140, a slow integrator 142, an integrator disable switch Q1, a level detector 144, and a differential driver 146. Fast integrator 140 serves to detect the presence of narrowband pulses 98 (FIG. 3) in demodulated output DMO and removes energy due to data pulses 99. Slow integrator 142 integrates the output of fast integrator 140 so that a number of narrowband pulses must occur before allowing the remote line sense data RLSD output of phase decoder 56 to change from true to false. Slow integrator 142 serves to improve noise performance. Disable switch Q1 serves to disable the output of slow integrator 142 when receive data RXD is in the space state. This is desirable, as narrowband pulses 98 are only present in demodulated output DMO when receiver data RXD is in mark or idle state. Level detector 144 uses a comparator 148 to determine when the output of slow integrator 142 has reached a level sufficient to indicate that the predetermined number of narrowband pulses 98 reversals has occurred. A resistor R37 and capacitor C34 may be used to additionally adjust the change in the output level of comparator 148, so that remote line sense data RLSD has equal rise and fall times. Differential driver 146 serves to both clamp remote line sense data RLSD to the false state if data carrier detect DCD indicates a lost receive carrier, as well as to provide additional buffering.

Fast integrator 140 may be embodied as a series resistor R30 with shunt capacitor C30 connected from the demodulated output DMO signal to ground. The output of series resistor R30 is fed to the positive input of a comparator U8a. The minus input of comparitor U8a is coupled to the output of a series resistor voltage divider formed at a node between a resistor R31 and a potentiometer R32. The voltage divider is connected between a positive voltage supply +V and ground. The output of comparator U8a is fed through series resistor R33 to a shunt reverse bias diode D6. Diode D6 serves to insure that the output of fast integrator 140 does not reach a negative voltage level.

Slow integrator 142 includes a series resistor R34 and ground shunt capacitor C31.

Switch Q1 is embodied as a field effect transistor having its drain connected to the output of R34, resistor R34 and shunt capacitor C31, source connected to ground, and gate connected to the receive data RXD signal. The output of slow integrator 142 is at the node where capacitor C31, resistor R34, and switch Q1 connect.

Level detector 144 includes a second comparator U8b. The plus input of comparator U8b is coupled to the output of slow integrator 142. The minus input of comparator U8b is fed by a voltage divider formed from pair of series resistors R35 and R36 coupled between the +V supply and ground. Bypass capacitors C32 and C33 are preferably connected between the +V and a −V voltage supply near comparators U8a-d. Series forward biased diode D7 is coupled to the output of comparator U8b and feeds a ground shunt resistor R37 and ground shunt capacitor C34. The output of series diode D7 is also fed to the minus input of a third comparator U8c. The plus input of this comparator is fed by the output of a voltage divider formed from two resistors R38 and R39 placed in series between the +V supply and ground. The output of this voltage divider is also fed to the minus input of U8d forming part of differential driver 146.

Differential driver 146 is seen to include a reverse biased series diode D8 feeding a pull-up resistor R40 couple to the +V supply. The data carrier detect DCD signal is fed through a reverse biased diode D9 to the input of comparator U8d. Resistor R40 and diodes D8 and D9 serve to allow the data carrier detect DCD signal to force remote line sense data RLSD to a logic low level if data carrier detect indicates lost carrier. The output of comparator U8d is provided with proper impedance and voltage levels by appropriately selected supply shunt diodes D10 and D11, and series output resistor R41.

Phase decoder 56 has been found to work well with an IDVC operating at 9600 baud and having a signaling false state phase reversal rate of 1/16 the mark carrier frequency using the following circuits and component values:

| Component Name | Nominal Value or Part Number and Manufacturer |
| --- | --- |
| R30 | 56K ohms |
| R31 | 22K ohms |
| R32 | 20K ohms |
| R33 | 10K ohms |
| R34 | 100K ohms |
| R35 | 100K ohms |
| R36 | 22K ohms |
| R37 | 22K ohms |
| R38 | 39K ohms |
| R39 | 100K ohms |
| R40 | 22K ohms |
| R41 | 300 ohms |
| C30 | 180 pf |

-continued

| Component Name | Nominal Value or Part Number and Manufacturer |
|---|---|
| C31 | 15 nf |
| C32 | 10 nf |
| C33 | 10 nf |
| C34 | 10 nf |
| U8a–d | DL064, Analog Devices, Inc. |
| D6–D11 | 1N4148 Motorola, Inc. |

Having described a preferred embodiment of the invention, numerous variations may now become apparent to those of skill in the art. For example, other arrangements of components for phase encoder 62 and phase decoder 56 would provide the same function. The signaling handshake signal may be other than bi-phase modulated as shown here. Other data communications protocols besides RS232 having the need for a signaling handshake signal may be supported. Higher data rates may be accommodated with appropriate adjustment of circuit parometers. Although only the mark or idle carrier is modulated by the above system, the other carrier could also be modulated to indicate a second handshake signal.

It is felt therefore that this invention should not be limited in scope to the particular embodiments shown and described, but only by the spirit and scope of claims that follow.

What is claimed is:

1. A first data voice multiplexer transmitting information to a second data voice multiplexer, comprising:
   first means, fed by a switched data signal and coupled to a carrier signal, for frequency shift key modulating the carrier signal in accordance with the data signal;
   means for maintaining the frequency shift key modulated carrier signal in a predetermined state when the data signal is switched off; and
   second means, coupled to the frequency shift key modulated carrier signal and fed by a signalling signal indicating whether data is ready to be sent to the second data voice multiplexer, for selectively further modulating the carrier signal when the signalling signal indicates signalling false state or selectively not further modulating the carrier signal when the signalling signal indicates signalling true state.

2. Apparatus as in claim 1 additionally comprising:
   means for signalling said second data voice multiplexer to loop-back information transmitted by said first data voice multiplexer, said signalling means comprising means for attenuating the carrier signal.

3. Apparatus as in claim 1 where the baud rate of the signalling signal is less than the baud rate of the data signal.

4. Apparatus as in claim 3 where the second means phase modulates the frequency shift key modulated carrier signal.

5. Apparatus as in claim 1 where the second means phase modulates the frequency shift key modulated carrier signal.

6. Apparatus as in claim 1 where the second means amplitude modulates the frequency shift key modulated carrier signal.

7. Apparatus as in claim 1 further comprising means for switching said switched data signal when said carrier signal indicates a signalling true state.

8. A first data voice multiplexer transmitting information to a second data voice multiplexer, comprising:
   first means, fed by a switched data signal and coupled to a carrier signal, for frequency shift key modulating the carrier signal in accordance with the data signal;
   means for maintaining the frequency shift key modulated carrier signal in a predetermined state when the data signal is switched off;
   second means, coupled to the frequency shift key modulated carrier signal and fed by a signalling signal indicating whether data is ready to be sent to the second data voice multiplexer, for selectively phase modulating the carrier signal when the signalling signal indicates signalling false state or selectively not phase modulating the carrier signal when the signalling signal indicates signalling true state, the second means comprising:
   (1) a counter, fed by the frequency shift key modulated carrier signal at a clock input and providing a divided signal; and
   (2) an exclusive or gate, fed by the frequency shift key modulated carrier signal and the divided signal.

9. A near end voice multiplexer comprising:
   first means, fed by a frequency multiplexed signal having at least one carrier signal for determining if a far end data voice multiplexer is requesting entry of a loop-back test mode wherein data from the far end data voice multiplexer is transmitted back to the far end data voice multiplexer, said request being determined by comparing a voltage of the carrier signal to a predetermined voltage threshold; and
   second means, fed by the multiplexed signal, for determining if the far end data voice multiplexer is entering signalling false state wherein data is not ready for transmission from said far end data voice multiplexer, said state being determined within said second means by detecting modulation of the carrier signal.

10. A near end data voice multiplexer comprising:
    first means, fed by a frequency multiplexed signal having at least one carrier signal for determining if a far end data voice multiplexer is requesting entry of a loop-back test mode wherein data from the far end data voice multiplexer is transmitted back to the far end data voice multiplexer, such request is determined by comparing a voltage of the carrier signal to a predetermined voltage threshold; and
    second means, fed by the multiplexed signal, for determining if the far end data voice multiplexer is entering signalling false state wherein data is not ready for transmission from said far end data voice multiplexer, such state is determined within said second means by detecting modulation of the carrier signal, the second means further comprises:
    means, fed by the carrier signal, or providing a fast integrated carrier signal;
    means, fed by the fast integrated carrier signal, for providing a slow integrated signal;
    a level detector, coupled to the slow integrator providing means, and providing a phase detect signal.

11. A data and voice communications system transmitting information from a first station to a second station, said system comprising:
    a receiver disposed within the second station comprising:

(1) means responsive to a signal transmitted to the second station by the first station with a first characteristic for placing the second station in a loop-back mode wherein data transmitted from the first station is to be transmitted back to the first station;

(2) means responsive to said signal when the signal is transmitted to the second station by the first station with a second different characteristic for producing in the second station a signal which indicates the first station is not ready to transmit data to the second station; and (3) means responsive to said signal when the signal is transmitted to the second station by the first station with a third different characteristic for producing in the second station a signal which indicates that a the first station is sending data to the second station.

12. The system as recited in claim 11 wherein said signal has a fixed frequency carrier.

13. A data and voice communications system transmitting information from a first station to a second station, said system comprising:
   a receiver disposed within the second station comprising:
   (1) means responsive to a signal transmitted to the second station by the first station with a first characteristic for placing the second station in a loop-back mode wherein data transmitted from the first station is to be transmitted back to the first station, said first characteristic of the signal being an attenuated FSK modulated carrier; and
   (2) means responsive to said signal when the signal is transmitted to the second station by the first station with a second different characteristic for producing in the second station a signal which indicates whether the first station is or is not ready to transmit data to the second station.

14. A data and voice communications system transmitting information from a first station to a second station, said system comprising:
   a receiver disposed within the second station comprising:
   (1) means responsive to a signal transmitted to the second station by the first station with a first characteristic for placing the second station in a loop-back mode wherein data transmitted from the first station is to be transmitted back to the first station; and
   (2) means responsive to said signal when the signal is transmitted to the second station by the first station with a second different characteristic for producing in the second station a signal which indicates whether the first station is or is not ready to transmit data to the second station, said second characteristic of the signal being a phase modulated FSK modulated carrier.

15. A data and voice communications system transmitting information from a first station to a second station, said system comprising:
   a receiver disposed within the second station comprising:
   (1) means responsive to a signal transmitted to the second station by the first station with a first characteristic for placing the second station in a loop-back mode wherein data transmitted from the first station is to be transmitted back to the first station; and
   (2) means responsive to said signal when the signal is transmitted to the second station by the first station with a second different characteristic for producing in the second station a signal which indicates whether the first station is or is not ready to transmit data to the second station, said second characteristic of the signal being an amplitude modulated FSK modulated carrier.

16. Communication apparatus adapted for transmitting information between a first office and a second office, comprising:
   means for encoding a data signal for transmission from said first office to said second office, said encoding means comprising means fed by said data signal for frequency shift keying between a pair of carrier frequencies in accordance with said data signal;
   means for retransmitting information received at said second office from said first office back to said first office;
   means for providing a control signal for transmission from said first office to said second office to enable said retransmitting means, said control signal providing means comprising means for inhibiting transmission of one of said carrier frequencies to said second office; and
   means for providing a handshake status signal to said second office, said handshake status signal providing means comprising means for modulating one of said carrier frequencies.

17. The apparatus recited in claim 16 wherein said handshake status signal providing means comprises means for frequency modulating said one carrier frequency.

18. The apparatus recited in claim 16 wherein said handshake status signal providing means comprises means for amplitude modulating said one carrier frequency.

19. A data communication system for transmitting information from a first office to a second office, comprising:
   frequency modulation means, fed by a data signal, for providing a frequency modulated signal being frequency modulated in accordance with the data signal;
   handshake modulating means, fed by said frequency modulating means and a handshake signal, for further modulating the frequency modulated signal in accordance with the handshake signal to provide a transmitted signal;
   a telephone signal carrier, coupled to said handshake modulating means;
   handshake demodulating means, coupled to said telephone signal carrier, for demodulating the transmitted signal to recover the handshake signal;
   means responsive to said recovered handshake signal for placing the second office in a loop-back mode wherein data transmitted from the first office is to be retransmitted by the second office back to the first office;
   frequency demodulating means, coupled to said telephone signal carrier, for frequency demodulating the transmitted signal to recover the data signal; and
   means responsive to said recovered handshake signal for producing a signal in said second office which indicates whether the first otiice is or is not ready to transmit data to said second office.

* * * * *